US011131353B2

(12) United States Patent
Scoparo et al.

(10) Patent No.: US 11,131,353 B2
(45) Date of Patent: Sep. 28, 2021

(54) SPLINED PORTION CONNECTED TO ONE OUT OF A BRAKE DISC AND A HUB

(71) Applicant: Volvo Truck Corporation, Gothenburg (SE)

(72) Inventors: Luciano Scoparo, Gothenburg (SE); Ingemar Dagh, Gothenburg (SE); Kent Augustsson, Bollebygd (SE); Tobias Andersson, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/041,754

(22) PCT Filed: Mar. 26, 2018

(86) PCT No.: PCT/EP2018/025071
§ 371 (c)(1),
(2) Date: Sep. 25, 2020

(87) PCT Pub. No.: WO2019/185106
PCT Pub. Date: Oct. 3, 2019

(65) Prior Publication Data
US 2021/0148425 A1    May 20, 2021

(51) Int. Cl.
*F16D 65/12* (2006.01)
*B60B 27/00* (2006.01)
*F16D 65/02* (2006.01)

(52) U.S. Cl.
CPC ........ *F16D 65/123* (2013.01); *B60B 27/0052* (2013.01); *F16D 2065/1356* (2013.01); *F16D 2065/1392* (2013.01)

(58) Field of Classification Search
CPC ..... F16D 2065/1328; F16D 2065/1348; F16D 2065/1392
(Continued)

(56) References Cited

U.S. PATENT DOCUMENTS 4,576,255 A   3/1986 Méry et al.
6,139,215 A   10/2000 Kühne et al.
(Continued)

FOREIGN PATENT DOCUMENTS

DE    1945934 A1    3/1971
DE    2513914 A1    10/1975
DE    10254110 A1   6/2004

OTHER PUBLICATIONS

International Search Report and Written Opinion for PCT/EP2018/025071, dated Nov. 27, 2018, 9 pages.
(Continued)

*Primary Examiner* — Christopher P Schwartz
(74) *Attorney, Agent, or Firm* — Withrow & Terranova, PLLC

(57) ABSTRACT

A splined portion (10) connected to one out of a brake disc and a hub to which the brake disc is to be connected. The splined portion comprises teeth (30) adapted to mesh with grooves in a second splined portion (20) connected to the other of said brake disc and hub, and extends annularly about an axially extending central axis. At least one, preferably a plurality, of the teeth (30) of the splined portion (10) is split into at least two tooth portions (31, 32) being resiliently movable towards and away from each other in a circumferential direction of the splined portion (10). The splined portion (10) further comprises a tensioning means (40) adapted to releasably adjust the circumferential distance between the two tooth portions (31, 32).

15 Claims, 6 Drawing Sheets

(58) Field of Classification Search
USPC .................................. 188/17, 18 A, 218 XL
See application file for complete search history.

(56) References Cited

U.S. PATENT DOCUMENTS

| | | | | |
|---|---|---|---|---|
| 7,261,193 B2* | 8/2007 | Gripemark | ............... | F16D 55/36 |
| | | | | 188/18 A |
| 7,475,758 B2* | 1/2009 | Dimsey | ................... | F16D 65/12 |
| | | | | 188/17 |
| 2003/0111303 A1* | 6/2003 | Wirtanen | ................ | F16D 65/12 |
| | | | | 188/17 |
| 2004/0195059 A1* | 10/2004 | Williams | ................ | F16D 65/54 |
| | | | | 188/218 XL |
| 2008/0093184 A1* | 4/2008 | Freeman | ............... | F16D 65/123 |
| | | | | 188/218 XL |
| 2011/0210492 A1* | 9/2011 | Snyder | ................... | F16D 65/12 |
| | | | | 267/161 |
| 2012/0097491 A1* | 4/2012 | Yamanaka | ............... | B21J 15/04 |
| | | | | 188/218 XL |
| 2015/0034430 A1 | 2/2015 | Nakakura | | |

OTHER PUBLICATIONS

International Preliminary Report on Patentability for PCT/EP2018/025071, dated Jun. 8, 2020, 27 pages.

* cited by examiner

SPLINED PORTION CONNECTED TO ONE OUT OF A BRAKE DISC AND A HUB

This application is a 35 USC 371 national phase filing of International Application No. PCT/EP2018/025071, filed Mar. 26, 2018, the disclosure of which is incorporated herein by reference in its entirety.

TECHNICAL FIELD

The invention relates to a splined portion connected to one out of a brake disc and a hub to which the brake disc is to be connected, the splined portion comprising teeth adapted to mesh with grooves in a second splined portion connected to the other of said brake disc and hub, the splined portion extending annularly about an axially extending central axis. Moreover, the present invention relates to a brake disc arrangement comprising a first splined portion and a corresponding second splined portion. Also, the invention relates to a vehicle comprising a splined portion, and to a method for connecting or disconnecting a first splined portion to a second splined portion.

The invention can be applied in heavy-duty vehicles such as trucks, buses and construction equipment. Although the invention will be described with respect to a truck, the invention is not restricted to this particular vehicle, but may also be used in other vehicles such as a bus or a working machine.

BACKGROUND

Splined portions may be used for transferring momentum between different parts in a vehicle, wherein a first splined portion comprises teeth adapted to mesh with grooves in a second splined portion. In particular, splined portions may be used for connecting a brake disc and a hub in a vehicle, preferably a heavy duty vehicle, such as a truck.

The interconnection between a brake disc and a hub in a vehicle will when in use be subject to environmental conditions which eventually result in corrosion of the splined portions. When the splined portions get corroded, they attach to one another, meaning that a substantial force is required for removing the brake disc from the hub. In order to enable removing a brake disc from a hub, i.e. for replacement of the brake disc, special tools have been designed. However, in some cases it is not possible to remove the brake disc from the hub even with such tools. In those cases, it may be necessary to cut and/or break the brake disc to have it removed from the hub.

US2003/0111303 A1 discloses an arrangement for releasable fastening of an annular brake disc to a wheel hub, comprising external axial grooves between ridges. Between the ridges, spacing gaps are formed to accommodate removable spacing devices which removably fix the brake disc to the wheel hub. This solution requires however a large number of parts to be assembled.

As such, it would be desirable to provide an improved splined interconnection between a brake disc and a hub.

SUMMARY

An object of the invention is to provide a splined portion connected to one out of a brake disc and a hub to which the brake disc is to be connected, which provides facilitated removal of the brake disc from the hub, in particular after corrosion has occurred.

The object is achieved by a splined portion according to claim 1.

As such, the invention relates to a splined portion connected to one out of a brake disc and a hub to which the brake disc is to be connected, the splined portion comprising teeth adapted to mesh with grooves in a second splined portion connected to the other of said brake disc and hub. The splined portion extends annularly about an axially extending central axis.

According to the present invention, at least one, preferably a plurality, of the teeth of the splined portion is split into at least two tooth portions being resiliently movable towards and away from each other in a circumferential direction of the splined portion. The splined portion further comprises a tensioning means adapted to releasably adjust the circumferential distance between the two tooth portions.

By the tensioning means providing for a possibility to releasably adjust the circumferential distance between the two tooth portions, when the first portion is arranged such that its teeth mesh with the grooves in the second splined portion, the contact forces between the two tooth portions and the corresponding groove of the second splined portion may be adjusted. Accordingly, the tensioning means provides for a possibility of decreasing the contact forces between the two tooth portions and the corresponding groove when the splined portion is to be removed from the second splined portion. The decrease in contact forces between the two splined portions, facilitates removal of the first splined portion from the second splined portion or vice versa.

The two tooth portions being resiliently movable towards and away from each other in a circumferential direction of the splined portion, is to be understood as the two tooth portions being resilient enough to be movable towards and away from each other using the tensioning means.

Optionally, the circumferential distance between the two tooth portions, when the splined portion is in a relaxed condition, may be non-zero. For example, the non-zero circumferential distance between the two tooth parts may be uniform along at least a part of the radial extension of the tooth parts, when the splined portion is in a relaxed condition.

Optionally, the circumferential distance between the two tooth portions, when the splined portion is in a relaxed condition, may be zero. In other words, the two tooth portions, although split, may contact each other along at least a part of their radial extension.

Optionally, the at least one of the teeth may be split into at least two tooth portions by a cut, extending along a radial direction and axially through the tooth. Optionally, the cut may follow a radius to the central axis. Such a cut may for example form a gap or a slit.

Optionally, the tensioning means is adapted to increase the circumferential distance between the two tooth portions in relation to a relaxed state of the split tooth so as to enable contact between the two tooth portions and the corresponding second splined portion, when the splined portion is connected to the second splined portion. In such a configuration, the tensioning means may be used to increase the circumferential distance between the two tooth portions when the first splined portion is connected to the second splined portion, so as to increase the contact forces between the contact surfaces of the two tooth portions and corresponding contact surfaces of the second splined portion. When the first splined portion is to be disconnected from the second splined portion, the tensioning means may be adjusted to decrease the circumferential distance between the two tooth portions, so as to decrease the contact forces between the contact surfaces of the two tooth portions and corresponding contact surfaces of the second splined portion.

Optionally, the tensioning means is arranged to be accessible from an axial direction of the first splined portion for enabling adjustment of the circumferential distance between the two tooth portions. Such a configuration implies that the tensioning means is easily accessible when the first and second splined portions are in connection with each other.

Optionally, the tensioning means is arranged between the first and the second tooth portions to adjust the circumferential distance between the two tooth portions.

Optionally, the tensioning means is arranged to be movable in the axial direction of the first splined portion for adjustment of the circumferential distance between the two tooth portions.

Optionally, the tensioning means comprises a conical element, preferably a bolt and a conical washer.

Optionally, the at least two tooth portions are two similar tooth halves.

Optionally, the at least two tooth portions form an axial hole between them.

Optionally, the tensioning means is adapted for introduction into said axial hole.

Optionally a plurality, preferably an even number, of the teeth of the splined portion are split, preferably at least four, most preferred at least six.

Optionally, the splined portion is a hub to which a brake disc is to be connected, and the second splined portion is said brake disc.

Optionally, the splined portion is a brake disc, and the second splined portion is a hub to which said brake disc is to be connected.

A second aspect of the present invention relates to a brake disc arrangement comprising a first splined portion according to the first aspect of the invention, and a corresponding second splined portion.

A third aspect of the present invention relates to a vehicle, preferably a heavy-duty vehicle, such as a truck, comprising a splined portion according to the first aspect of the invention, and/or a brake disc arrangement according to the second aspect of the invention.

A fourth aspect of the present invention relates to a method for connecting or disconnecting a first splined portion according to the first aspect of the invention to the second splined portion, comprising controlling the circumferential distance between the tooth portions of each split tooth of the first part using the tensioning means, so as to increase or decrease contact forces between the two tooth portions and the corresponding groove of the second splined portion.

It will be understood that features and advantages described herein in relation to the first aspect of the invention are equally applicable to the second, third and fourth aspect of the invention.

Further features of, and advantages with, the present invention will become apparent when studying the appended claims and the following description. The skilled person will realise that different features of the present invention may be combined to create embodiments other than those described in the following, without departing from the scope of the present invention.

BRIEF DESCRIPTION OF THE DRAWINGS

With reference to the appended drawings, below follows a non-limiting more detailed description of embodiments of the invention cited as examples.

In the drawings.

DETAILED DESCRIPTION OF PREFERRED EMBODIMENTS

Figure 1:
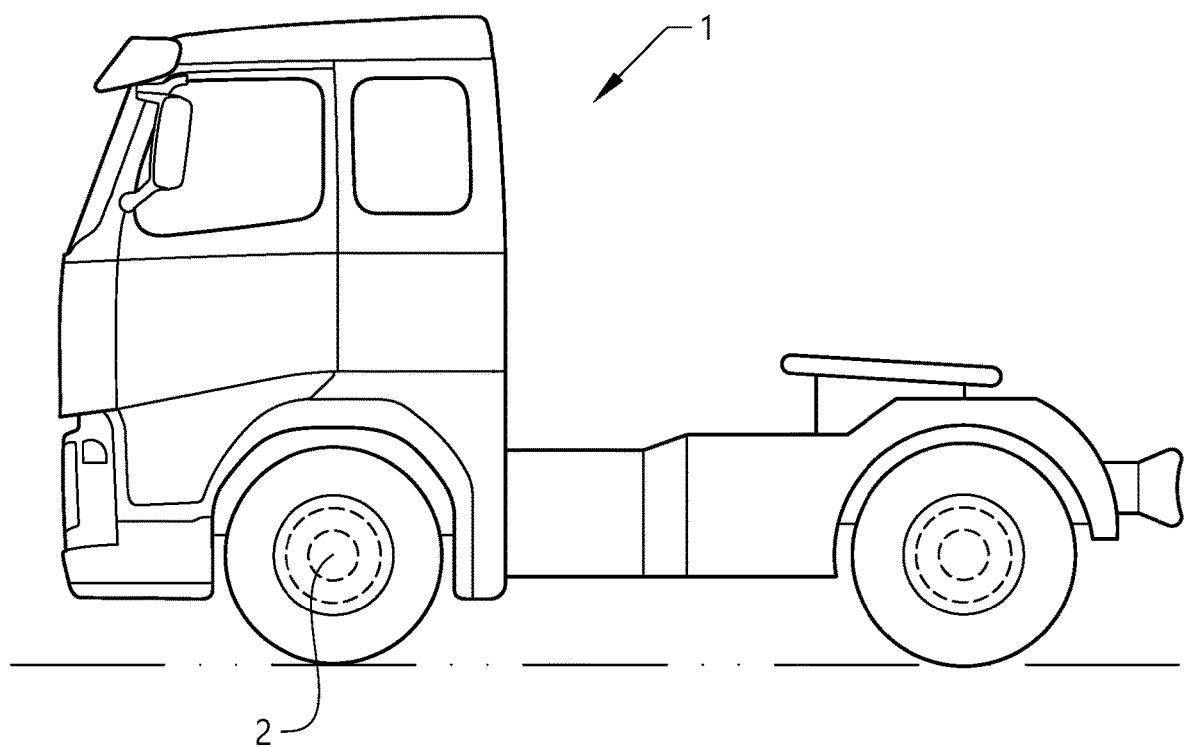
FIG. 1 is a schematic view of a vehicle.

The present invention will now be described more fully with reference to the accompanying drawings, in which exemplary embodiments of the invention are shown. The invention may however be embodied in many different forms and should not be construed as limited to the embodiments set forth herein; rather the embodiments are provided for thoroughness and completeness. Like reference characters refer to like elements throughout the description.

The invention will be described below for a vehicle in the form of a truck 1 such as the truck illustrated in FIG. 1. The truck 1 should be seen as an example of a vehicle which could comprise a splined portion and/or a brake disc arrangement according to the present invention.

However, the present invention may be implemented in a plurality of different types of vehicles. Purely by way of example, the present invention could be implemented in a truck, a tractor, a car, a bus, a work machine such as a wheel loader or an articulated hauler, or any other type of construction equipment.

Figure 2:
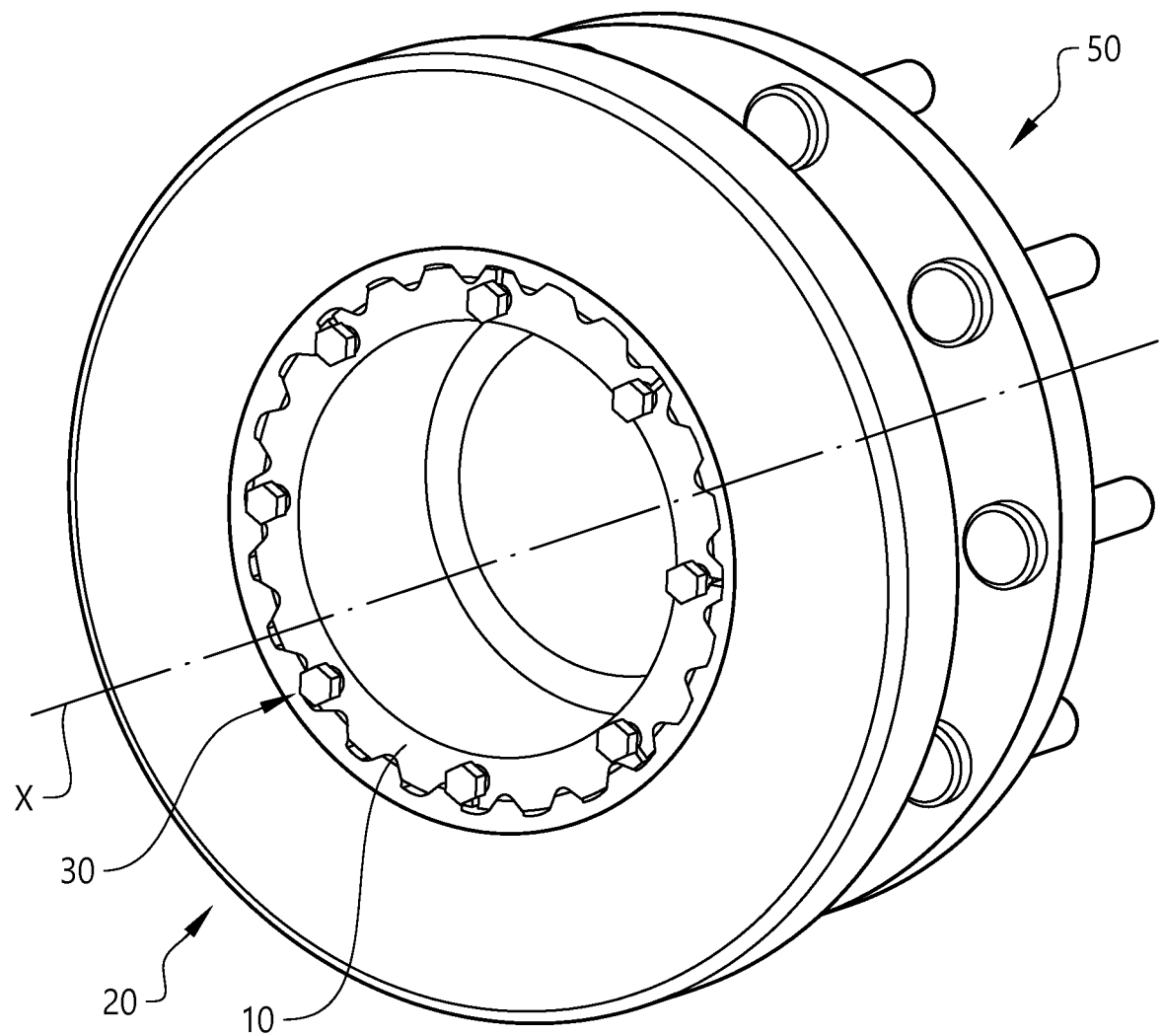
FIG. 2 is a perspective view of an embodiment of a brake disc arrangement.

The FIG. 1 vehicle 1 comprises a brake disc arrangement 50 as illustrated in FIG. 2. A vehicle 1 may comprise one or more brake disc arrangements for example in connection with wheel suspension and/or drive arrangements. As may be gleaned from FIG. 2, the brake disc arrangement 50 comprises a splined portion 10, connected to a hub. The splined portion 10 comprises a teeth 30 adapted to mesh with grooves in a second splined portion 20, connected to a brake disc. The first splined portion and the second splined portion extend annularly about an axially extending central axis X.

Figure 3:
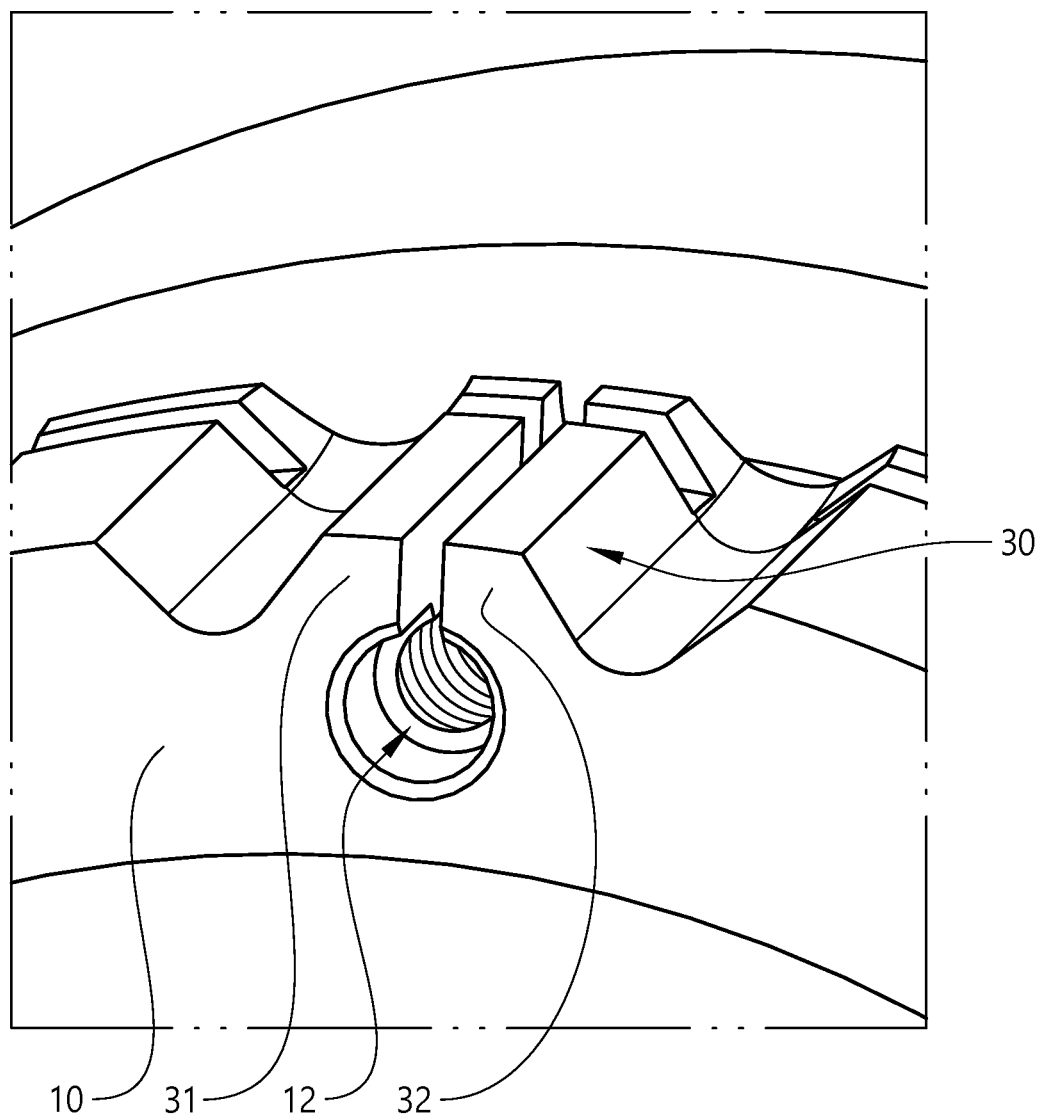
FIG. 3 is a perspective view of an embodiment of a part of a splined portion.

FIG. 3 is a perspective partial view of an embodiment of a splined portion 10, which may for example be connected to a hub as in FIG. 2. The splined portion 10 comprises teeth 30, three of which may be gleaned from FIG. 3. The teeth 30 are adapted to mesh with grooves in a second splined portion 20. In FIG. 3, one tooth 30 is split into two tooth portions 31, 32 being resiliently movable towards and away from each other in a circumferential direction of the first splined portion 10. The splined portion 10 further comprises a tensioning means 40, which is omitted in FIG. 3. The tensioning means 40 is adapted to releasably adjust the circumferential distance between the two tooth portions 31, 32.

The FIG. 3 embodiment is an example of an embodiment where the circumferential distance between the two tooth portions, when the splined portion is in a relaxed condition, is non-zero, along the entire radial extension of the tooth parts. Such embodiments may be realized by the tooth portions being divided by a cut forming a gap.

Other embodiments may be envisaged, wherein the circumferential distance between the two tooth portions—when the splined portion is in a relaxed condition—is zero, along at least a part of the radial extension of the tooth parts. This means that the tooth portions 31, 32 will contact each other. Such embodiments may be realised by the tooth portions 31, 32 being divided by a cut forming e.g. a narrow slit.

In the FIG. 3 embodiment, the tooth parts 31, 32 are divided by a gap extending in a radial direction from an outer edge of the tooth 30, providing a uniform circumferential distance.

In the illustrated embodiment, the gap extends radially from an outer edge of the tooth 30 to an axial hole 12, formed between the first and the second tooth portions 31, 32.

The axial hole 12 is adapted for introduction of the tensioning means therein. For example, the axial hole 12 may be defined by a partly circular inner wall formed between the tooth portions 31, 32, adapted for receiving a circular tensioning means such as a bolt or screw.

As described in the above, in the illustrated embodiment, the two tooth portions are divided by an axial cut, forming a gap 13 having a uniform circumferential width, followed by a partly circular hole 12 (as seen in a direction radially towards the central axis).

Optionally, other embodiments are conceivable by varying the size and shape of the cut, forming e.g. gaps or slits, and/or an axial hole.

Advantageously, any such embodiments may be adapted such that a tensioning means may be arranged between the first and the second tooth portions to adjust the circumferential distance between the two tooth portions.

Figure 4:
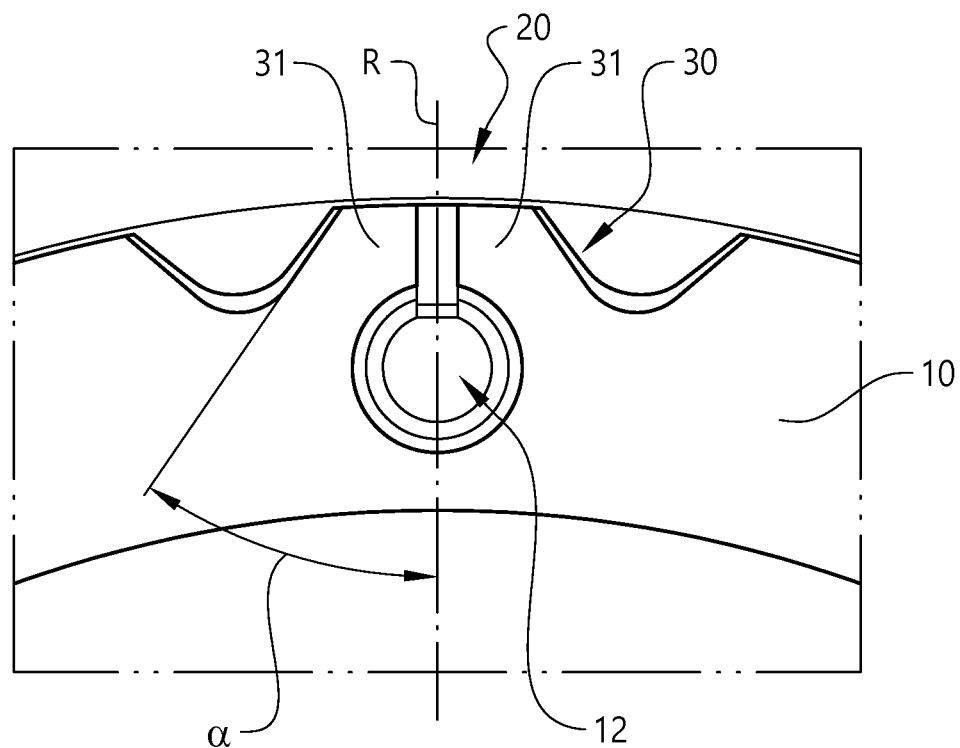
FIG. 4 is a planar view of an embodiment of a part of a splined portion.
Figure 5:
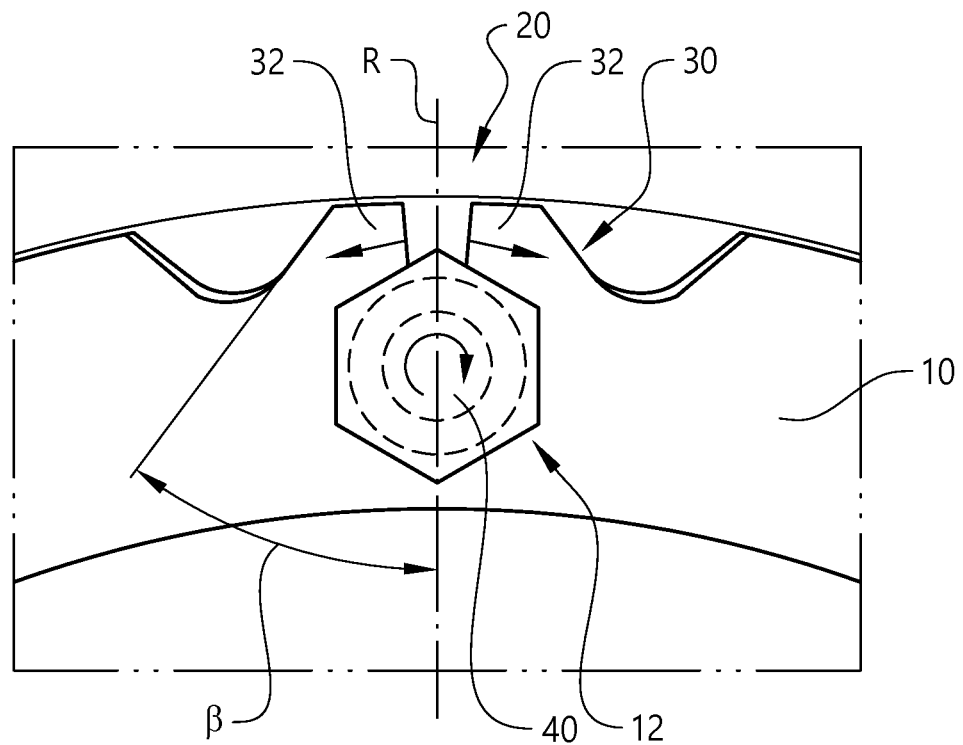
FIG. 5 is the planar view of FIG. 4, including a tensioning element.

FIG. 4 is a side view of the split tooth 30 of the splined portion 10 in FIG. 3 without a tensioning means, and FIG. 5 is the same side view of the spit tooth 30, with a tensioning means 40.

The tensioning means 40 is adapted to reasably adjust the circumferential distance between the two tooth portions 31, 32

In the illustrated embodiment, the tensioning means is adapted to increase the circumferential distance between the two tooth portions 31, 32 in relation to a relaxed state of the split tooth 30, so as to enable or increase contact between the two tooth portions 31, 32 and the corresponding second splined portion, when the splined portion is connected to the second splined portion.

Hence, the angle beta formed between the contact surface of a tooth portion 31 and a radius R to the central axis, when the tensioning means 40 is in use (FIG. 5) is greater than the corresponding angle alfa formed between the contact surface of the tooth portion 31 and a radius R to the central axis, when the tooth (30) is in a relaxed state (FIG. 4).

When the first splined portion 10 is connected to the second splined portion 20, the first and second splined portions 10, 20 may first be arranged such that the teeth 30 of the first splined portion 10 mesh with the corresponding structures of the second splined portion 20. Thereafter, the tensioning means 40 may be used to increase the circumferential distance between the two tooth portions 31, 32 so as to increase the contact forces between the contact surfaces of the two tooth portions 31, 32 and corresponding contact surfaces of the second splined portion 20. When the first splined portion 10 is to be disconnected from the second splined portion 20, the tensioning means 40 may be adjusted to decrease the circumferential distance between the two tooth portions 31, 32, so as to decrease the contact forces between the contact surfaces of the two tooth portions 31, 32 and corresponding contact surfaces of the second splined portion 20.

The tensioning means 40 as illustrated in FIG. 5 is arranged to be accessible from an axial direction of the first splined portion 10 for enabling adjustment of the circumferential distance between the two tooth portions 31, 32. This feature is advantageous in that it enables access to the tensioning means 20 when the splined portion 10 is in connection with the second splined portion 20.

Further, FIG. 5 is an example of an embodiment where the tensioning means 40 is arranged to be movable in the axial direction of the first splined portion 10 for adjustment of the circumferential distance between the two tooth portions 31, 32.

Figure 6:
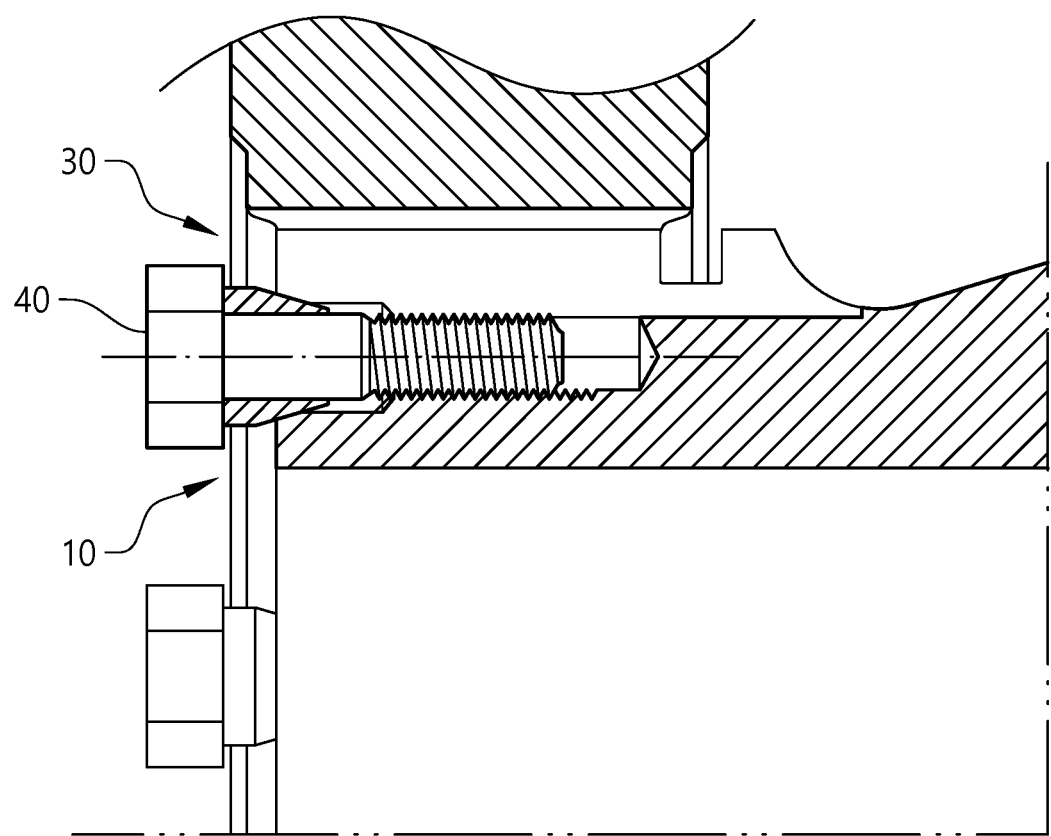
FIG. 6 is a cross-sectional view of an embodiment of a brake disc arrangement.

FIG. 6 is a cross-sectional view of the split tooth 30 with the tensioning means 40. As seen in FIG. 6, the tensioning means 40 has an axial extension, and a cross-sectional width which varies with the axial extension. Accordingly, by adjusting the axial position of the tensioning means 40 between the tooth portions 31, 32 of the tooth, the circumferential distance between the tooth portions 31, 32 may be adjusted.

Figures 7, 8:
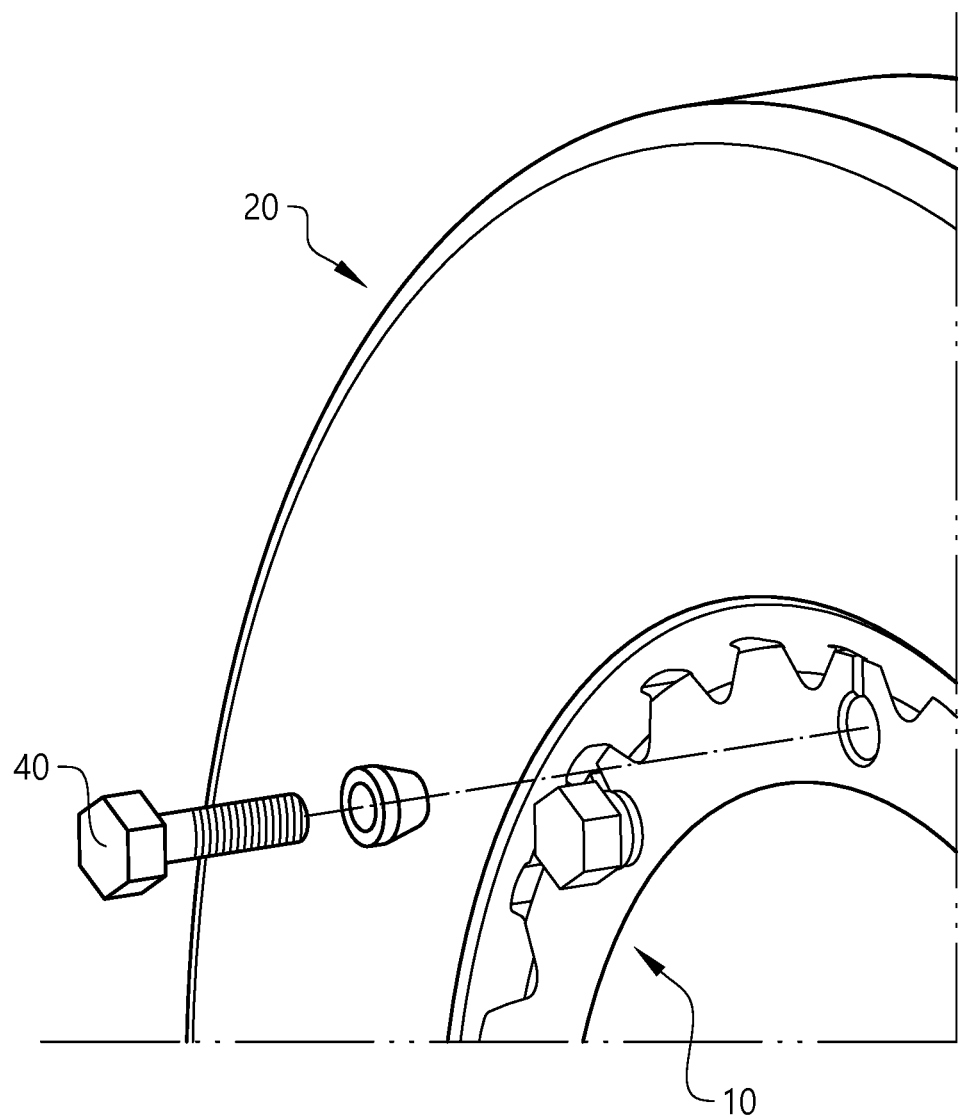
FIG. 7 illustrates the assembly of the brake disc arrangement of FIG. 6.
FIG. 8 is a flow chart illustrating an embodiment of a method for connecting or disconnecting a first splined portion to a second splined portion.

A tensioning means 40 having an axial extension, and a cross sectional width which varies with the axial extension, may advantageously comprise a conical element. In the embodiment of FIG. 6, and as also shown in FIG. 7, the tensioning means 40 comprises a bolt and a conical washer.

According to the invention, at least one tooth 30 of the splined portion 10 is split into two tooth portions 31, 32. To increase the desired effect, preferably a plurality of the teeth 30 of the splined portion 10 is split. It is believed to be preferable that an even number of the teeth of the splined portion 10 is spit. In this case the even number of split tooth 30 may be arranged in opposing pairs. The number of split tooth 30 may be selected depending on the size and dimensions of the splined portion, and/or the number of teeth of the split portion. For example, at least four or more preferred at least six out of the teeth 30 of the splined portion 10 may be split.

Also, it may be envisaged that every tooth of the splined portion is split. However it may be advantageous if between every second and every sixth tooth of the splined portion is split.

In the embodiment illustrated in the drawings, eight teeth 30 are split into two tooth portions 31, 32. The eight split teeth 30 are arranged in four opposing pairs. In the illustrated embodiment, this means that every third of the tooth 30 of the splined portion is split.

In the illustrated embodiment, the invention is described with reference to a splined portion 10 being a hub to which a brake disc is to be connected, and the second splined portion 20 is said brake disc.

However, it is to be understood that the invention and the features described in relation with embodiments in the above, may also be applied where the splined portion 10 is a brake disc, and the second splined portion 20 is a hub to which said brake disc is to be connected.

FIG. 8 illustrates an embodiment of a method for connecting or disconnecting a first splined portion in accordance with the invention to a second splined portion. The method comprises S10 controlling the circumferential distance between the tooth portions of each split tooth of the first portion using the tensioning means, so as to increase or decrease contact forces between the two tooth portions and the corresponding groove of the second splined portion.

When the method is used for connecting a first splined portion 10 to a second splined portion, the first splined portion 10, the first and second splined portions 10, 20 may first be arranged such that the teeth 30 of the first splined portion 10 mesh with grooves in the second splined portion 20. Thereafter, step S10, is performed, wherein the circumferential distance between the tooth portions of each split tooth of the first portion is controlled using the tensioning means 40 so as to increase contact forces between the two tooth portions and the corresponding groove of the second splined portion 20.

Accordingly, contact between the first splined portion 10 and the second splined portion is enhanced via the increased contact forces between the first and second portions 31, 32 of the split tooth 30 and the corresponding groove of the second splined portion 20.

When the method is used for disconnecting a first splined portion 10 to a second splined portion, the first splined portion 10, the first and second splined portions 10, 20 are initially already arranged such that the teeth 30 of the first splined portion 10 mesh with grooves in the second splined portion 20. Thereafter, step S10, is performed, wherein the circumferential distance between the tooth portions of each split tooth of the first portion is controlled using the tensioning means 40 so as to decrease contact forces between the two tooth portions and the corresponding groove of the second splined portion 20. Thereafter, the first splined portion 10 and the second splined portion may be axially removed from each other.

The splined portion may advantageously be formed from materials being conventional in the art for brake discs and corresponding hubs in vehicles, in particular from cast iron.

It is to be understood that the present invention is not limited to the embodiments described above and illustrated in the drawings; rather, the skilled person will recognize that many changes and modifications may be made within the scope of the appended claims.

The invention claimed is:

1. A brake disc arrangement comprising a first and a second splined portion, wherein the first splined portion is configured to be connected to one of a brake disc and a hub to which the brake disc is to be connected, the first splined portion comprising teeth configured to mesh with grooves in the second splined portion, the second splined portion configured to be connected to the other of the brake disc and hub, the first splined portion extending annularly about an axially extending central axis, wherein:
   at least one of the teeth of the first splined portion is a split tooth, the split tooth being split into at least two tooth portions resiliently movable towards and away from each other in a circumferential direction of the first splined portion; and
   the first splined portion further comprises a tensioner configured to releasably adjust the circumferential distance between the at least two tooth portion, the tensioner arranged in contact with each of the at least two tooth portions.

2. The brake disc arrangement of claim 1, wherein the tensioner is arranged between the at least two tooth portions to adjust the circumferential distance between the at least two tooth portions.

3. The brake disc arrangement of claim 2, wherein the tensioner configured to be movable in the axial direction of the first splined portion for adjustment of the circumferential distance between the at least two tooth portions.

4. The brake disc arrangement of claim 3, wherein the tensioner comprises a conical element.

5. A brake disc arrangement according to claim 4, wherein the conical element comprises a bolt and a conical washer.

6. The brake disc arrangement of claim 1, wherein the at least two tooth portions form an axial hole therebetween.

7. The brake disc arrangement of claim 6, wherein the tensioner is configured to be introduced into the axial hole.

8. The brake disc arrangement of claim 1, wherein the tensioner configured to increase the circumferential distance between the at least two tooth portions in relation to a relaxed state of the split tooth to enable contact between the at least two tooth portions and the corresponding second splined portions, when the first splined portion is connected to the second splined portion.

9. The brake disc arrangement of claim 1, wherein the tensioner configured to be accessible from an axial direction of the first splined portion for enabling adjustment of the circumferential distance between the at least two tooth portions.

10. The brake disc arrangement of claim 1, wherein the at least two tooth portions are two similar tooth halves.

11. The brake disc arrangement of claim 1, wherein a plurality of the teeth of the first splined portion are split.

12. The brake disc arrangement of claim 1, wherein the first splined portion is configured to be connected to the hub to which the brake disc is to be connected, and the second splined portion is configured to be connected to the brake disc.

13. The brake disc arrangement of claim 1, wherein the first splined portion is configured to be connected to the brake disc, and the second splined portion is configured to be connected to the hub to which the brake disc is to be connected.

14. A vehicle comprising: a brake disc arrangement comprising:
   a first and a second splined portion, wherein the first splined portion is configured to be connected to one of a brake disc and a hub to which the brake disc is to be connected, the first splined portion comprising teeth configured to mesh with grooves in the second splined portion, the second splined portion configured to be connected to the other of the brake disc and hub, the first splined portion extending annularly about an axially extending central axis,
   wherein at least one of the teeth of the first splined portion is a split tooth, the split tooth being split into at least two tooth portions resiliently movable towards and away from each other in a circumferential direction of the first splined portion; and
   wherein the first splined portion further comprises a tensioner configured to releasably adjust the circumferential distance between the at least two tooth portions, the tensioner arranged in contact with each of the at least two tooth portions.

15. A method for connecting or disconnecting a first splined portion to a second splined portion of a brake disc arrangement the brake disc arrangement comprising a first and a second splined portion, wherein the first splined portion is connected to one out of a brake disc and a hub to which the brake disc is to be connected, the first splined portion comprising teeth adapted to mesh with grooves in the second splined portion, the second splined portion being connected to the other of the brake disc and hub, the first splined portion extending annularly about an axially extending central axis, wherein at least one of the first splined portions is a split tooth, the split tooth being split into at least two tooth portions resiliently movable towards and away from each other in a circumferential direction of the first splined portion, and wherein the first splined portion further comprising a tensioner adapted to releasably adjust the circumferential distance between the at least two tooth portions, wherein the tensioner is arranged in contact with each of the at least two tooth portions, the method comprising:

controlling the circumferential distance between the at least two tooth portions of each split tooth of the first portion using the tensioner to increase or decrease contact forces between the at least two tooth portions and the corresponding groove of the second splined portion.

\* \* \* \* \*